US011162797B2

(12) United States Patent
Linder

(10) Patent No.: US 11,162,797 B2
(45) Date of Patent: *Nov. 2, 2021

(54) MAP MATCHING METHOD AND APPARATUS

(71) Applicant: HERE Global B.V., Eindhoven (NL)

(72) Inventor: Eric Linder, Downers Grove, IL (US)

(73) Assignee: HERE GLOBAL B.V., Eindhoven (NL)

( * ) Notice: Subject to any disclaimer, the term of this patent is extended or adjusted under 35 U.S.C. 154(b) by 549 days.

This patent is subject to a terminal disclaimer.

(21) Appl. No.: 16/004,833

(22) Filed: Jun. 11, 2018

(65) Prior Publication Data

US 2019/0376795 A1 Dec. 12, 2019

(51) Int. Cl.
| G01C 21/30 | (2006.01) |
| H04W 4/40 | (2018.01) |
| H04W 4/021 | (2018.01) |
| G06F 16/29 | (2019.01) |

(52) U.S. Cl.
CPC ............ *G01C 21/30* (2013.01); *G06F 16/29* (2019.01); *H04W 4/021* (2013.01); *H04W 4/40* (2018.02)

(58) Field of Classification Search
CPC .......... G01C 21/30; G06F 16/29; H04W 4/40; H04W 4/021
See application file for complete search history.

(56) References Cited

U.S. PATENT DOCUMENTS

| 5,436,840 A | 7/1995 | Lam et al. |
| 8,489,316 B1 | 7/2013 | Hedges et al. |
| 10,677,598 B2* | 6/2020 | Linder .................. G06F 16/909 |
| 2012/0101718 A1 | 4/2012 | Lee |
| 2012/0277985 A1* | 11/2012 | Witmer .................. G01C 21/32 |
| | | 701/119 |

FOREIGN PATENT DOCUMENTS

CN 102147261 8/2011

OTHER PUBLICATIONS

Ren "Advanced Map Matching Technologies and Techniques for Pedestrian/wheelchair Navigation" University of Pittsburgh, dated Mar. 16, 2012.

* cited by examiner

*Primary Examiner* — Abby Y Lin
*Assistant Examiner* — Renee LaRose
(74) *Attorney, Agent, or Firm* — Alston & Bird LLP

(57) ABSTRACT

A method, apparatus and computer program product are provided to process probe data in accordance with an efficient map matching technique. Methods may include obtaining a road link within a geographic area from a database of a plurality of road links; calculating a plurality of areas of interest and a centroid for each; receiving a probe data point from a probe apparatus including one or more sensors and being onboard a vehicle, where the probe data point includes location information associated with the probe apparatus; determining that the probe data point location information corresponds to the geographic area; determining that the probe data point location corresponds to an area of interest disposed along the road link within the geographic area; and map matching the probe data point to a centroid of the area of interest determined to correspond to the probe data point location.

20 Claims, 6 Drawing Sheets

MAP MATCHING METHOD AND APPARATUS

TECHNOLOGICAL FIELD

An example embodiment relates generally to the map matching of probe points to a corresponding road segment as represented by a map and, more particularly, to the map matching of probe points to road segments in an approximate manner that reduces or eliminates complex calculations improving the speed of map matching while reducing the computational costs associated therewith.

BACKGROUND

Probe points are frequently captured by global positioning systems ("GPS"), navigation systems or the like. Each probe point is associated with a location, such as may be expressed in terms of latitude and longitude. Some probe points are also associated with a heading and a speed at which the GPS system or the navigation system was moving at the time at which the probe point was captured.

In some instances, such as within a region for which a map consisting of a plurality of road segments has been created, the probe points may be matched to the map in order to identify the location along a road segment at which the probe point was captured. Map matching may be performed in real time, such as by navigation systems in order to identify the location of the probe point relative to the road segments represented by the map. For example, navigation systems mounted within a vehicle may perform real time map matching in order to depict the relative position of a probe point upon a map, thereby illustrating the current location of the vehicle. Map matching for real time applications may only utilize the path of probe points up to the most recent probe point since those are the only probe points that are known. Alternatively, map matching may rely upon post-processing, such as in instances in which the probe points captured by a plurality of GPS systems or navigation systems are matched to the road segments represented by a map for traffic estimation or other purposes. The accuracy of the map matching provided by post-processing may be improved relative to the map matching for real time applications since probe points captured subsequent in time to the probe point currently being processed are also known and may be referenced during the post-processing.

A variety of probe-centric map matching techniques have been developed. These map matching techniques include map matching techniques that utilize geometric analysis including point-to-point analysis, point-to-curve analysis and trajectory techniques. Other map matching techniques utilize a topological analysis of the road network to improve accuracy and performance. Some map matching techniques utilize probabilistic map-matching algorithms. The probabilistic map-matching algorithms attempt to identify the most probable road segment in some confidence region about a respective probe point. Additionally or alternatively, probabilistic map-matching algorithms may attempt to identify the most probable path in addition to the most probable road segment. The probabilistic map-matching algorithms may include, for example, Viterbi and hidden Markov model techniques. Further, map-matching techniques may include other types of map-matching algorithms including those that utilize Kalman and extended Kalman based techniques and those that utilize particle filters.

Whether performed in real time or as a post-processing technique, map matching has been a probe-centric process in which each probe point is analyzed to identify the closest road segment and the projection of the probe point onto the closest road segment. In order to identify the closest road segment, a separate spatial search is generally conducted for each probe point; even in instances in which a probe point is spaced a substantial distance from any road segment. Thus, the number of spatial searches to be conducted is generally proportional to the number of probe points.

Spatial searches are computationally expensive. For example, probe-centric map matching techniques for large probe data sets, such as millions of probe points, can incur substantial execution time and costs since the number of spatial searches is proportional to the number of probe points. Thus, map matching and, in particular, the spatial searches for each of the probe points may become a limiting factor at least for real time applications.

BRIEF SUMMARY

A method, apparatus and computer program product are provided in accordance with an example embodiment in order to approximate map matching in such a way as to pre-process map matching data points to reduce or eliminate complex calculations during map matching of probe data points, whether performed in real time or in post processing. By using the approximate map matching techniques described herein, methods, apparatuses, and computer program products of example embodiments may, in many instances, require less processing capacity and may improve efficiency while decreasing or eliminating latency in map matching probe data points to road links. Embodiments may provide an apparatus to map match probe data points to a road segment including at least one processor and at least one non-transitory memory including computer program code instructions. The computer program code instructions may be configured to, when executed, cause the apparatus to at least: obtain a road link within a geographic area from a database of a plurality of road links; calculate a plurality of areas of interest along a length of the road link; calculate a centroid of each of the plurality of areas of interest along the length of the road link; receive a probe data point from a probe apparatus including one or more sensors and being onboard a vehicle, where the probe data point includes location information associated with the probe apparatus; determine that the probe data point location information corresponds to the geographic area; determine that the probe data point location corresponds to an area of interest disposed along the road link within the geographic area; map match the probe data point to a centroid of the area of interest determined to correspond to the probe data point location; and provide for at least one of navigational assistance or at least semi-autonomous vehicle control in response to map matching the probe data point to the centroid of the area of interest.

According to some embodiments, causing the apparatus to calculate a plurality of areas of interest may include causing the apparatus to: determine a maximum map match distance within which a probe data point must be of a road segment to be map matched to that road segment; determine an acceptable error threshold defining a maximum acceptable distance error for map matching a probe data point along a road segment, wherein each of the plurality of areas of interest is a rectangle having a first dimension based upon the maximum map match distance and a second dimension based upon the acceptable error threshold. The first dimension for an area of interest may extend in a longitudinal direction and the second dimension may extend in a latitudinal direction in response to a heading of the road link being between northeast and southeast or between northwest and southwest. The first dimension for an area of interest may extend in a latitudinal direction and the second dimension may extend in a longitudinal direction in response to the heading of the road link being between northwest and northeast or between southwest and southeast. Each area of interest may be defined by at least two points, each point including a longitude and latitude, and each of the at least two points defining a corner of the rectangle of the area of interest.

Map matching the probe data point to an area of interest may include causing the apparatus of example embodiments to: compare a latitude of the probe data point against a minimum latitude of the at least two points of a respective area; compare the latitude of the probe data point against a maximum latitude of the at least two points of the respective area; compare a longitude of the probe data point against a minimum longitude of the at least two points of the respective area; and compare the longitude of the probe data point against a maximum longitude of the at least two points of the respective area. The probe data point may be map matched to the area of interest in response to the latitude of the probe data point being above the minimum latitude of the at least two points of the area of interest and below the maximum latitude of the at least two points of the area of interest, and the longitude of the probe data point being above the minimum longitude of the at least two points of the area of interest and below the maximum longitude of the at least two points of the area of interest.

Causing the apparatus of example embodiments to determine that the probe data point location corresponds to an area of interest within the geographic area disposed along the road link may include causing the apparatus to: determine that the probe data point location corresponds to at least two areas of interest within the geographic area; determine a heading of the probe data point; determine a heading of each of the at least two areas of interest corresponding to a portion of the road link to which each of the at least two areas of interest correspond; where causing the apparatus to determine that the probe data point location corresponds to an area of interest within the geographic area disposed along the road link includes causing the apparatus to determine that the probe data point location corresponds to an area of interest of the at least two areas of interest having a heading closest to the heading of the probe data point. Causing the apparatus to determine that the probe data point location corresponds to an area of interest within the geographic area disposed along the road link may include causing the apparatus to: determine that the probe data point location corresponds to at least two areas of interest within the geographic area; calculate a distance from the probe data point location to a centroid of each of the at least two areas of interest; where causing the apparatus to determine that the probe data point location corresponds to an area of interest within the geographic are disposed along the road link includes causing the apparatus to determine that the probe data point location corresponds to an area of interest of the at least two areas of interest having a centroid closest to the location of the probe data point.

Embodiments of the present disclosure may provide a computer program product including at least one non-transitory computer-readable storage medium having computer-executable program code portions stored therein. The computer-executable program code portions may include program code instructions configured to: obtain a road link within a geographic area from a database of a plurality of road links; calculate a plurality of areas of interest along a length of the road link; calculate a centroid of each of the plurality of areas of interest along the length of the road link; receive a probe data point from a probe apparatus including one or more sensors and being onboard a vehicle, where the probe data point includes location information associated with the probe apparatus; determine that the probe data point location information corresponds to the geographic area; determine that the probe data point location corresponds to an area of interest disposed along the road link within the geographic area; map match the probe data point to a centroid of the area of interest determined to correspond to the probe data point location; and provide for at least one of navigational assistance or at least semi-autonomous vehicle control in response to map matching the probe data point to the centroid of the area of interest.

The program code instructions to calculate a plurality of areas of interest may include program code instructions to: determine a maximum map match distance within which a probe data point must be of a road segment to be map matched to that road segment; and determine an acceptable error threshold defining a maximum acceptable distance error for map matching a probe data point along a road segment. Each of the plurality of areas of interest may be a rectangle having a first dimension based upon the maximum map match distance and a second dimension based upon the error threshold. The first dimension for an area of interest may extend in a longitudinal direction and the second dimension may extend in a latitudinal direction in response to a heading of the road link being between northeast and southeast or between northwest and southwest. The first dimension for an area of interest may extend in a latitudinal direction and the second dimension may extend in a longitudinal direction in response to the heading of the road link being between northwest and northeast or between southwest and southeast. Each area of interest may be defined by at least two points, each point including a latitude and longitude, and each of the at least two points defining a corner of a rectangle.

The program code instructions to map match the probe data point to an area of interest may include program code instructions to: compare a latitude of the probe data point against a maximum latitude of the at least two points of a respective area; compare the latitude of the probe data point against a maximum latitude of the at least two points of the respective area; compare a longitude of the probe data point against a minimum longitude of the at least two points of the respective area; compare the longitude of the probe data point against a maximum longitude of the at least two points of the respective area. The probe data point may be map matched to the area of interest in response to the latitude of the probe data point being above the minimum latitude of the at least two points of the area of interest and below the maximum latitude of the at least two points of the area of interest and the longitude of the probe data point being above the minimum longitude of the at least two points of the area of interest and below the maximum longitude of the at least two points of the area of interest.

The program code instructions to determine that the probe data point location corresponds to an area of interest within the geographic area disposed along the road link may include program code instructions to: determine that the probe data point location corresponds to at least two areas of interest within the geographic area; determine a heading of the probe data point; and determine a heading of each of the at least two areas of interest corresponding to a portion of the road link to which each of the at least two areas of interest correspond. The program code instructions to determine that the probe data point location corresponds to an area of interest within the geographic area disposed along the road link may include program code instructions to determine that the probe data point location corresponds to an area of interest of the at least two areas of interest having a heading closest to the heading of the probe data point. The program code instructions to determine that the probe data point location corresponds to an area of interest within the geographic area disposed along the road link may include program code instructions to: determine that the probe data point location corresponds to at least two areas of interest within the geographic area; and calculate a distance from the probe data point location to a centroid of each of the at least two areas of interest. The program code instructions to determine that the probe data point location corresponds to an area of interest within the geographic area disposed along the road link may include program code instructions to determine that the probe data point location corresponds to an area of interest of the at least two areas of interest having a centroid closest to the location of the probe data point.

Embodiments of the present invention may provide a method for map matching probe data points to a location on a road link. Methods may include: obtaining a road link within a geographic area from a database of a plurality of road links; calculating a plurality of areas of interest along a length of the road link; calculating a centroid of each of the plurality of areas of interest along the length of the road link; receiving a probe data point from a probe apparatus including one or more sensors and being onboard a vehicle, where the probe data point includes location information associated with the probe apparatus; determining that the probe data point location information corresponds to the geographic area; determining that the probe data point location corresponds to an area of interest disposed along the road link within the geographic area; map matching the probe data point to a centroid of the area of interest determined to correspond to the probe data point location; and providing for at least one of navigational assistance or at least semi-autonomous vehicle control in response to map matching the probe data point to the centroid of the area of interest.

Calculating a plurality of areas of interest may include: determining a maximum map match distance within which a probe data point must be of a road segment to be map matched to that road segment; and determining an acceptable error threshold defining a maximum acceptable distance error for map matching a probe data point along a road segment. Each of the plurality of areas of interest may be a rectangle having a first dimension based upon the maximum map match distance and a second dimension based upon the acceptable error threshold. The first dimension for an area of interest may extend in a longitudinal direction and the second dimension may extend in a latitudinal direction in response to a heading of the road link being between northeast and southeast or between northwest and southwest. The first dimension for an area of interest may extend in a latitudinal direction and the second dimension may extend in a longitudinal direction in response to the heading of the road link being between northwest and northeast or between southwest and southeast.

According to an example embodiment, each area of interest may be defined by at least two points, each point defining a latitude and a longitude, and each of the at least two points defining the rectangle of the area of interest. Map matching the probe data point to an area of interest may include: comparing the latitude of the probe data point against a minimum latitude of the at least two points of a respective area; comparing the latitude of the probe data point against a maximum latitude of the at least two points of the respective area; comparing the longitude of the probe data point against a minimum longitude of the at least two points of the respective area; and comparing the longitude of the probe data point against a maximum longitude of the at least two points of the respective area. The probe data point may be map matched to the area of interest in response to the latitude of the probe data point being above the minimum latitude of the at least two points of the area of interest and below the maximum latitude of the at least two points of the area of interest, and the longitude of the probe data point being above the minimum longitude of the at least two points of the area of interest and below the maximum longitude of the at least two points of the area of interest. Determining that the probe data point location corresponds to an area of interest within the geographic area disposed along the road link may include: determining that the probe data point location corresponds to at least two areas of interest within the geographic area; determining a heading of the probe data point; and determining a heading of each of the at least two areas of interest corresponding to a portion of the road link to which each of the at least two areas of interest correspond. Determining that the probe data point location corresponds to an area of interest within the geographic area disposed along the road link may include determining that the probe data point location corresponds to an area of interest of the at least two areas of interest having a heading closes to the heading of the probe data point.

Embodiments of the present invention may provide an apparatus for map matching probe data points to a location on a road link. The apparatus of example embodiments may include: means for obtaining a road link within a geographic area from a database of a plurality of road links; means for calculating a plurality of areas of interest along a length of the road link; means for calculating a centroid of each of the plurality of areas of interest along the length of the road link; means for receiving a probe data point from a probe apparatus including one or more sensors and being onboard a vehicle, where the probe data point includes location information associated with the probe apparatus; means for determining that the probe data point location information corresponds to the geographic area; means for determining that the probe data point location corresponds to an area of interest disposed along the road link within the geographic area; means for map matching the probe data point to a centroid of the area of interest determined to correspond to the probe data point location; and means for providing for at least one of navigational assistance or at least semi-autonomous vehicle control in response to map matching the probe data point to the centroid of the area of interest.

The means for calculating a plurality of areas of interest may include: means for determining a maximum map match distance within which a probe data point must be of a road segment to be map matched to that road segment; and means for determining an acceptable error threshold defining a maximum acceptable distance error for map matching a probe data point along a road segment. Each of the plurality of areas of interest may be a rectangle having a first dimension based upon the maximum map match distance and a second dimension based upon the acceptable error threshold. The first dimension for an area of interest may extend in a longitudinal direction and the second dimension may extend in a latitudinal direction in response to a heading of the road link being between northeast and southeast or between northwest and southwest. The first dimension for an area of interest may extend in a latitudinal direction and the second dimension may extend in a longitudinal direction in response to the heading of the road link being between northwest and northeast or between southwest and southeast.

According to an example embodiment, each area of interest may be defined by at least two points, each point defining a latitude and a longitude, and each of the at least two points defining the rectangle of the area of interest. The means for map matching the probe data point to an area of interest may include: means for comparing the latitude of the probe data point against a minimum latitude of the at least two points of a respective area; means for comparing the latitude of the probe data point against a maximum latitude of the at least two points of the respective area; means for comparing the longitude of the probe data point against a minimum longitude of the at least two points of the respective area; and means for comparing the longitude of the probe data point against a maximum longitude of the at least two points of the respective area. The probe data point may be map matched to the area of interest in response to the latitude of the probe data point being above the minimum latitude of the at least two points of the area of interest and below the maximum latitude of the at least two points of the area of interest, and the longitude of the probe data point being above the minimum longitude of the at least two points of the area of interest and below the maximum longitude of the at least two points of the area of interest. The means for determining that the probe data point location corresponds to an area of interest within the geographic area disposed along the road link may include: means for determining that the probe data point location corresponds to at least two areas of interest within the geographic area; means for determining a heading of the probe data point; and means for determining a heading of each of the at least two areas of interest corresponding to a portion of the road link to which each of the at least two areas of interest correspond. The means for determining that the probe data point location corresponds to an area of interest within the geographic area disposed along the road link may include means for determining that the probe data point location corresponds to an area of interest of the at least two areas of interest having a heading closest to the heading of the probe data point.

BRIEF DESCRIPTION OF THE DRAWINGS

Figure 1:
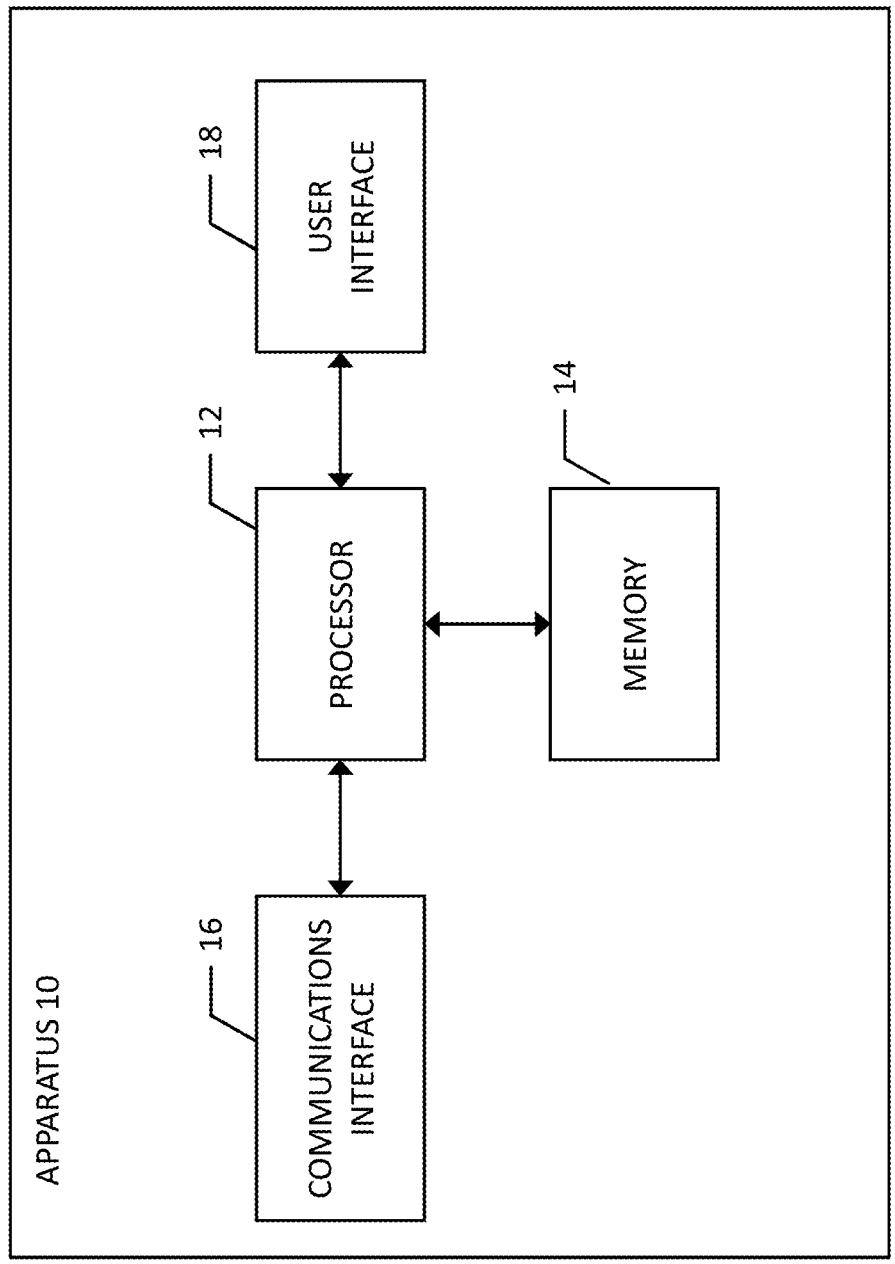
Figure 2:
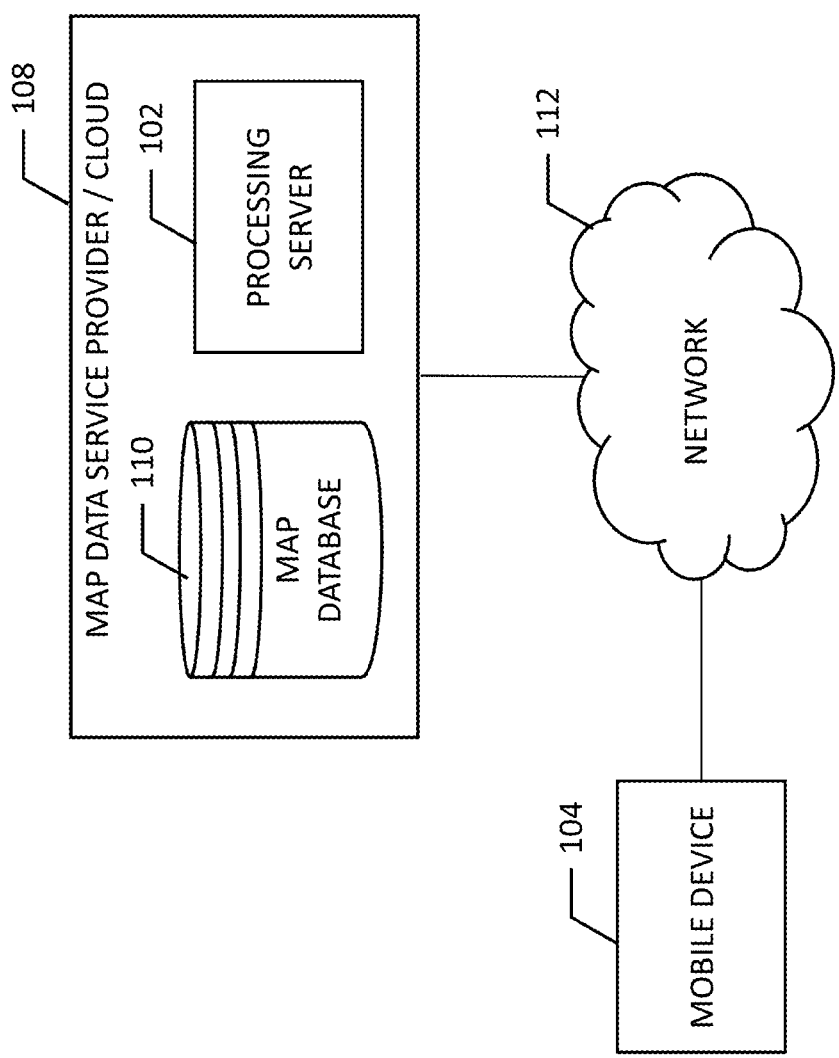
Figure 3:
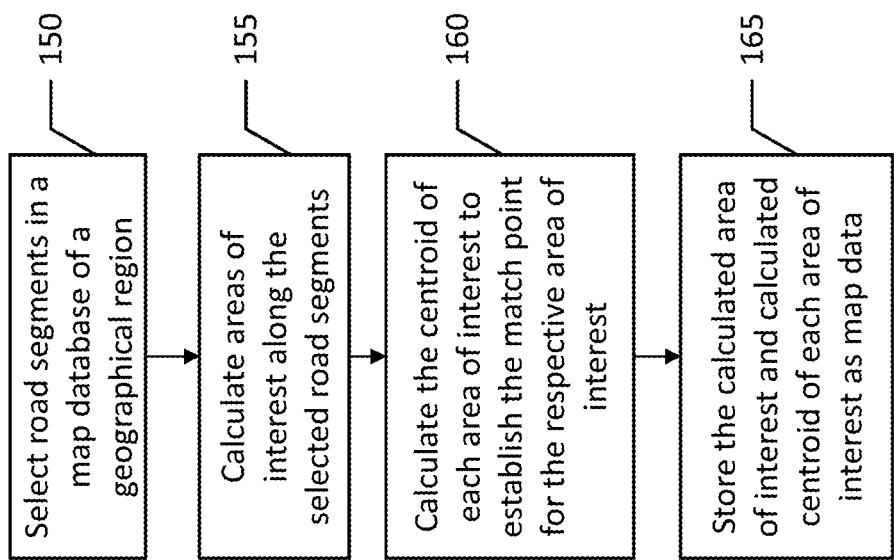
Figure 4:
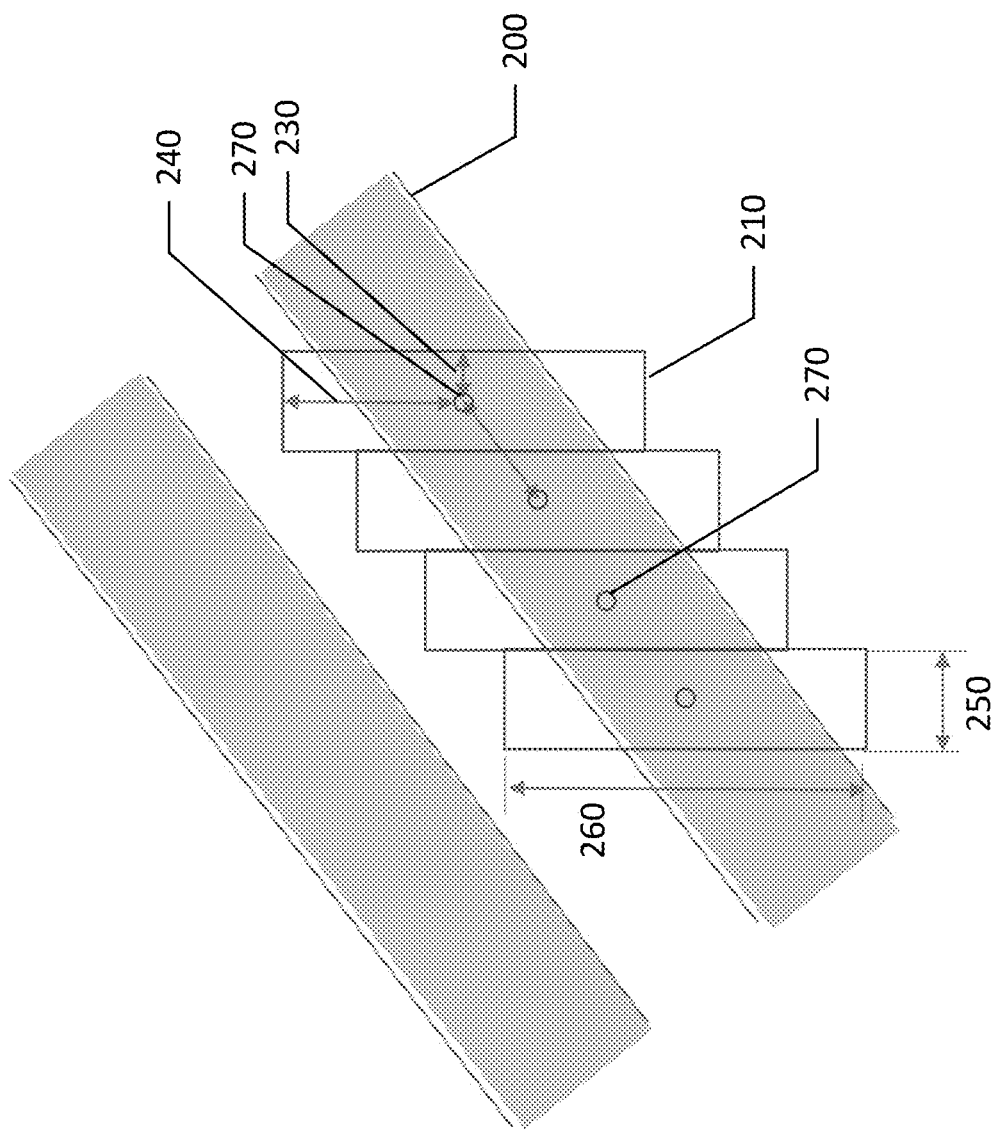
Figure 5:
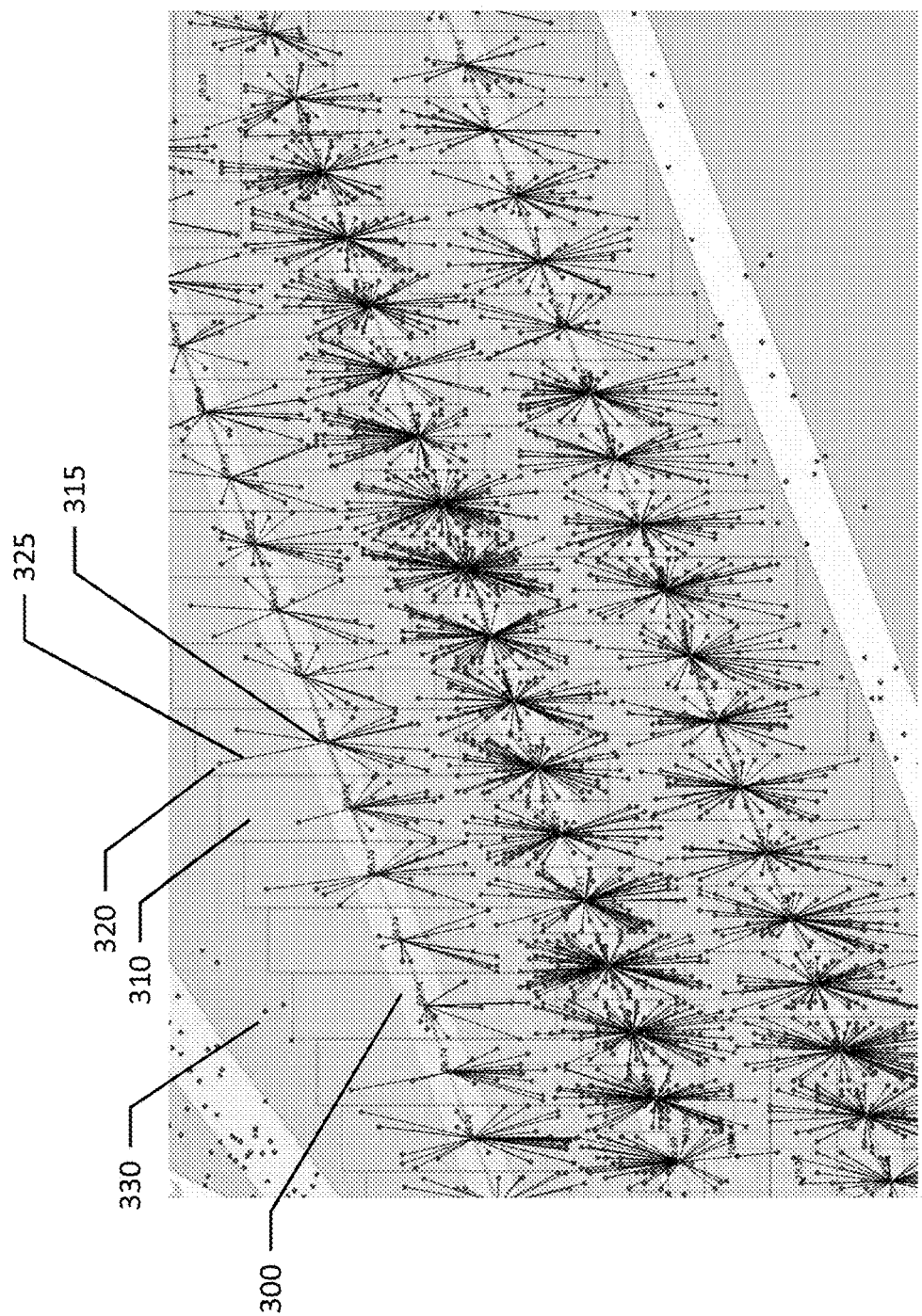
Figure 6:
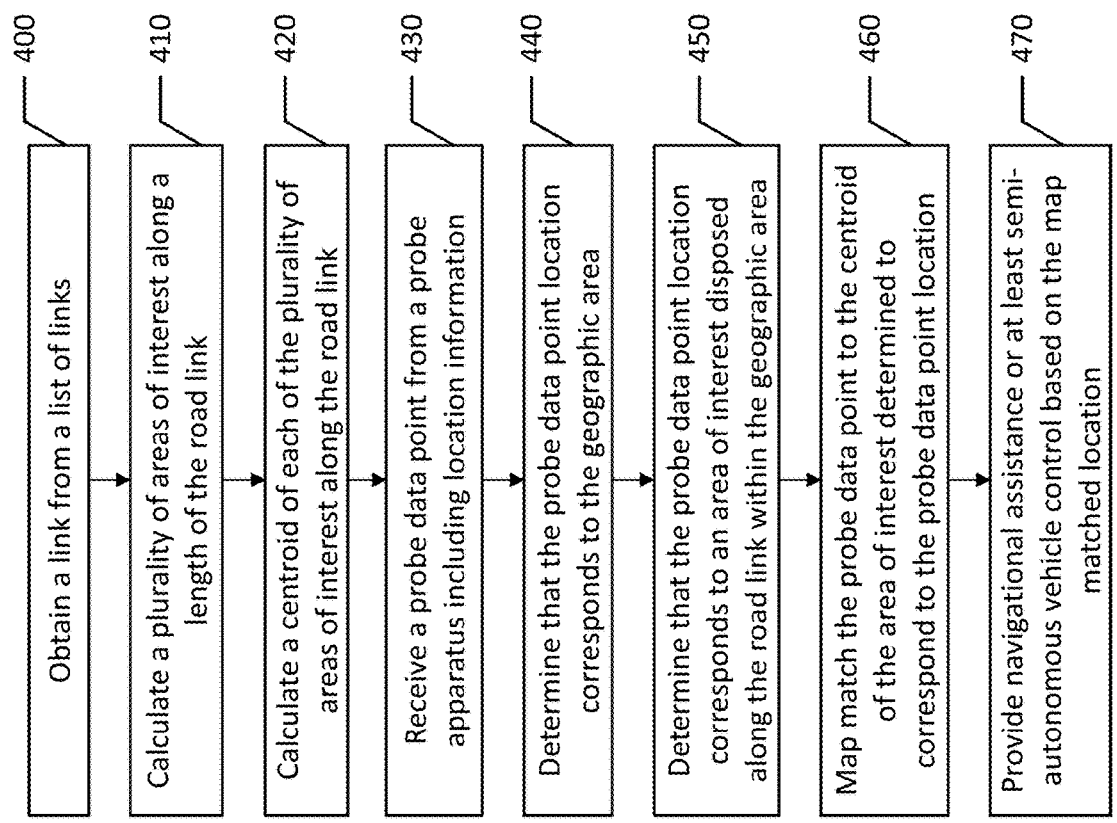

Having thus described certain example embodiments of the present disclosure in general terms, reference will hereinafter be made to the accompanying drawings, which are not necessarily drawn to scale, and wherein:

FIG. 1 is a block diagram of an apparatus according to an example embodiment of the present disclosure;

FIG. 2 is a block diagram of a system for identifying the probability of a plurality of paths comprising road segments according to an example embodiment of the present disclosure;

FIG. 3 is a flowchart illustrating the operations performed, such as by the apparatus of FIG. 1, in order to establish areas of interest associated with road links in accordance with an example embodiment of the present disclosure;

FIG. 4 illustrates a road link including areas of interest disposed at spaced apart increments along a length of the road link in accordance with an example embodiment of the present disclosure;

FIG. 5 illustrates a set of road links including a plurality of areas of interest with a plurality of probe data points map-matched to the centroids of the areas of interest according to an example embodiment of the present disclosure;

FIG. 6 is a flowchart illustrating the operations performed, such as by the apparatus of FIG. 1, in order to map-match one or more probe data points to a road link within a network of roads in accordance with an example embodiment of the present disclosure.

DETAILED DESCRIPTION

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to allow probe data points to be matched to road links or segments as represented by a map in a computationally efficient manner. In this regard, the method, apparatus and computer program product of an example embodiment use an approximate map matching technique that pre-computes areas of interest that allows more efficient map matching by removing distance computations for each point and replaces them with approximate map matched points for comparison to probe data points.

Embodiments described herein compute areas of interest offline or during periods of relatively low processing usage and stores the areas of interest for use during map matching. Since the map matching may be performed more efficiently in a pre-computed, approximated manner, the method, apparatus and computer program product of an example embodiment may be configured to support not only post-processing applications, but also real time applications that demand relatively timely map matching of the probe points.

The apparatus of an example embodiment may be embodied by a variety of computing devices including, for example, a navigation system, an advanced driver assistance system (ADAS), a GPS system or the like. Additionally or alternatively, the apparatus may be embodied in other types of computing devices, such as a server, a personal computer, a computer workstation, a laptop computer, a plurality of networked computing devices or the like, that are configured to analyze probe points, such as for traffic estimation or other purposes. In this regard, FIG. 1 depicts the apparatus 10 of an example embodiment that may be embodied by various computing devices including those identified above. As shown, the apparatus of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment also optionally includes a communication interface 16 that may be any means such as a device or circuitry embodied in either hardware or a combination of hardware and software that is configured to receive and/or transmit data from/to other electronic devices in communication with the apparatus, such as by being configured to receive probe data from a database, cloud storage or other external memory device and/or to provide a representation of the road geometry to an in-vehicle global positioning system (GPS), in-vehicle navigation system, a personal navigation device (PND), a portable navigation device or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 1, the apparatus 10 may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

The apparatus 10 may support a mapping or navigation application so as to present maps or otherwise provide navigation or driver assistance. In order to support a mapping application, the computing device may include or otherwise be in communication with a geographic database, such as may be stored in memory 14. For example, the geographic database includes node data records, road segment or link data records, point of interest (POI) data records, and other data records. More, fewer or different data records can be provided. In one embodiment, the other data records include cartographic data records, routing data, and maneuver data. In order to fully utilize map data within the map database, accurate map-matching of probe data points to locations on the map, such as road segments or links, is necessary.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle through map-matching techniques described herein. Semi-autonomous vehicle control may be any level of driver assistance from adaptive cruise control, to lane-keep assist, or the like.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 10 of FIG. 1, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or light detection and ranging (LIDAR), can be used to generate map geometries directly or through machine learning as described herein. However, the most ubiquitous form of data that may be available is vehicle data provided by vehicles, such as mobile device 104, as they travel the roads throughout a region.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a physical storage format (PSF)) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

In order to maximize the effectiveness of the utilization of a map database 110 and an ADAS or navigation system operating therewith, it is imperative to accurately determine where a probe data point or associated position of a vehicle is located within a network of road links or segments. Without accurate map-matching of probe data points to road links, map data obtained from the probe data points or map services provided to a vehicle functioning as a probe may be erroneous or lack usefulness. Therefore accurate map-matching of probe data to road links within a road network is critical to the accuracy and usefulness of map data, whether it is in the form of navigation, autonomous or semi-autonomous vehicle control, point-of-interest information, route guidance, or the like. Embodiments described herein provide an accurate method of map-matching in a computationally efficient manner to reduce processing costs while improving the speed of map-matching.

Probe data point and probe data trajectory or path map matching to one or more road segments can be computationally expensive. By removing or limiting the number of computations, embodiments described herein may improve the efficiency of map matching both in terms of reduced latency, and in terms of reduced computational expense. Embodiments described herein replace some or all map matching calculations with comparisons which are more efficient than complex mathematical calculations.

Map matching is typically performed based on individual probe data points or on paths from a sequence of probe data points. Map matching may be performed in point-to-link matching or link-to-point matching. Point-to-link map matchers may load links into a spatial data structure offline, traverse all points, compute an area of interest containing links that might map match to the point, retrieve all links in the computed area, and traverse all segments of all links in the area returned to find the closest segment with the correct heading and direction of travel. Link-to-point based map matchers load the points into a spatial data structure offline, generate a list of links of interest offline, travel each link requesting points from the spatial data structure with areas of interest that cover the current link of interest, and find the match point along the link for the current probe point. These map matching techniques require substantial processing capacity which can be both costly and introduce latency. Limiting the number of computations using the method described herein provides a significant advantage to reduce both processing capacity needed and latency. These computations are replaced with comparisons which can typically be performed more efficiently than complex mathematical calculations. In the point-to-link map matcher the distance calculation to the link candidates and the projection calculation to the selected candidate link are generally computationally expensive. For link-to-point map matching, the computational expense is incurred in the loading of the special data structure of probe data points and the creation of areas of interest for probe selection from the spatial data structure. Embodiments described herein reduce the complexity of the computations while also performing those reduced-complexity calculations during periods where processing capacity is more readily available.

In map matching of probe data points to road segments/links, a map match distance is the distance within which a probe data point may be map-matched to a point on a road segment. The map match distance is determined to allow for inaccuracies in location techniques such as GPS. Other potential contributors to the inaccuracies are the environment (e.g., within a vehicle), device error, method of collection, and the precision of the locationing means. Further, map matching algorithms and methods may introduce error. Thus, the map match distance is the tolerance for error in the probe data point away from a point to which it may be map matched. Beyond the map match distance from a point on a road segment, a probe data point would not be map matched to the point on the road segment. Further, an acceptable error threshold may be established along the road segment to define the acceptable degree of inaccuracy when matching a probe data point to a road segment. This acceptable error between the matched point on the road segment/link and the probe data point's actual position on the link must be defined according to example embodiments in order to create the boundaries of areas of interest along the road segments/links.

Embodiments described herein provide a method of map matching probe data points in an efficient and effective manner by pre-computing a match point that will be within a margin of error for matching to a snap point or match point on a road segment/link. Areas of interest along the road segment/link are precomputed that are structurally more efficient for comparison corresponding to the match point that is pre-computed. A distance along the link that is associated with the pre-computed match point is also pre-computed. Performing these actions before map matching is needed, such as during times of low processing demand and high processing capacity avoids expensive distance calculations for determining a closest road segment to a probe data point and map matches probe data points in an efficient and effective manner within a configurable degree of error.

In order to provide for map matching of probe data as represented by a plurality of probe points in an approximated and efficient manner, reference is now made to FIG. 3 in which the operations performed, such as by the apparatus 10 of FIG. 1, are depicted. In this regard, the apparatus of an example embodiment includes means, such as the processor 12, the memory 14, the communication interface 16 or the like, for using comparisons to establish a match between a probe data point and a road segment. The operations represented in FIG. 3 may be performed in advance of map matching operations and can be performed during periods of low processor utilization. For example, a map services provider 108 may perform the operations of FIG. 3 during periods of low map service data usage, such as during the night after traffic volumes have diminished and before morning traffic volumes begin to increase, resulting in higher user demand for mapping services.

As shown in FIG. 3, road segments of a map database are selected of a geographic region at 150. This operation may be performed based on a priority of road segments, such as road segments with higher functional classes or road segments with greater traffic volumes may be selected first, for example. Further, this may be performed periodically, with the periodic updating being more frequent on road segments that are prioritized based on any number of priority characteristics. At 155, areas of interest along the selected road segments are calculated. This is performed based on a map match distance and an acceptable error threshold of the map matching operation. The envelope of an area of interest may be established based on a distance that is related to the map matching distance of the road segment, where the map matching distance is the distance within which a probe data point is considered map matched to the respective road segment from which it is less than the map matching distance. For example, the areas of interest may each match the distance in length perpendicular to the direction of the road and spaced out along the road at a distance that is based upon the match distance, such as equal to the match distance.

The areas of interest may optionally not be oriented relative to the road, but to a coordinate system such as the geographic coordinate system with lengths and widths parallel to latitude and longitude, where the direction chosen for the map match distance boundary may be based on an axis that is most perpendicular to the direction of the road. As shown at 160, a centroid of each area of interest is calculated. The centroid becomes the match point for any probe data points found within the area of interest. The centroids are spaced apart at the error threshold (map matching distance) length along each road segment and lie along the road segment. The areas of interest and centroids of each area of interest are stored in the map database for subsequent map matching operations.

The areas of interest may also be established based on the acceptable error threshold for a map matched probe data point along the road segment. As described below, map matching in the example embodiments described herein is performed at intervals along the road segment, where probe data points are map matched only to points spaced apart at predefined distances. This predefined distance is established based on the acceptable error threshold, as a probe data point will only be map matched to one of the spaced apart points. The points must therefore be spaced apart at a measure at or below the acceptable error threshold.

Each road segment otherwise referred to as a road link in a network of road segments may be processed through the operations described with respect to the flowchart of FIG. 3, to generate an area of interest representation of the road link as illustrated in FIG. 4, by which a map matching area of interest is established using an error threshold/map matching distance and a polygon, circle, or ellipse to define the area of interest 210 about each centroid 270 along the road segment 200. This series of areas of interest for each road segment represents a boundary of the road link within which any probe data points found are map-matched to the road link at a respective centroid.

As shown in FIG. 4, a maximum match distance or acceptable error is used to space areas of interest along a road segment. For example, the spacing of areas of interest 210 along a road segment may be established as one half of the acceptable error, illustrated as distance 250. The length of the areas of interest, perpendicular to the direction or heading of the road segment represented by 260 may be established based on the acceptable error, such as twice the acceptable error. A centroid 270 of each area of interest 210 may be calculated and established as the match point for the area of interest. Based on the above dimensions of the areas of interest, a distance from the centroid 270 to the edges of the area of interest would be the match distance 240 in a direction perpendicular to the direction of the road, and a quarter of the match distance 230 in a direction parallel to the direction of the road.

These areas of interest as described with respect to FIG. 4 above may be pre-computed for a road segment or link and stored in a database, such as the map database 110 of the map data service provider 108. As the areas of interest are calculated, they may be stored in a name value key store. Keys may be generated using a physical storage format. In an example embodiment in which the map database 110 includes a tile-based map storage system with tiles subdivided according to levels where, for example, subdividing a tile to level 19 may result in tiles which are around thirty eight meters wide. This may provide a desirable tile resolution for the physical storage format when storing areas of interest relative to a road segment or link. This resolution affords some overlap where the areas of interest calculated may be found in more than one tile or extend between one tile and another, though this also limits the total number of areas of interest within a sub-divided tile at level 19 to a manageable number. Sub-divided tiles having no areas of interest may not need to be stored in the name value key store. FIG. 5 illustrates a set of road links 300 including a plurality of areas of interest 310 with a plurality of probe data points 330 within respective areas of interest map-matched to the respective centroids 315 of the areas of interest according to an example embodiment of the present disclosure, such as with probe data point 320 map-matched to centroid 315 along distance 325.

According to example embodiments described herein, when a search is conducted for a probe data point to associate with a sub-divided tile in the key store and no key store is returned, no subsequent search is conducted. This short-circuits the match process when a "miss" occurs such that the efficiency of map matching is increased. When a sub-divided tile is returned that contains multiple areas of interest, each area of interest may be represented by two points. Each point having a latitude and longitude and defining a minimum latitude and minimum longitude, along with a maximum latitude and maximum longitude. The two points can therefore provide a definition of the area of interest. Map matching probe data points within an area of interest require only four comparisons to establish whether the latitude and longitude of a probe data point is between a minimum latitude and maximum latitude of an area of interest, and between a minimum longitude and maximum longitude of the area of interest. This comparison is more computationally efficient than a distance calculation.

In response to a probe data point falling into an area of interest, where the latitude of the probe data point is between the minimum latitude and maximum latitude, and the longitude of the probe data point is between the minimum longitude and maximum longitude, the heading angle of the probe data point and an angle associated with the area of interest relative to the road segment of the area of interest are compared. If the heading of the probe data point and the angle of the road segment are within a predefined degree of similarity, the centroid of the area of interest is determined to be the snap point or match point for the probe data point along the road segment. The comparison of the heading relative to the road direction is a quality check to confirm that a probe data point traveling along another road segment, possibly having the same latitude and longitude, such as at an intersection or overpass, is map matched to the appropriate road segment.

According to some embodiments, a probe data point may be determined to fall within more than one area of interest. This may be when areas of interest overlap. While some probe data points may be map matched to a single one of these areas of interest based on heading relative to the road direction, if that check still results in more than one matching area of interest, the area of interest with the centroid closest to the probe data point location is determined to be the map matched area of interest, and the centroid of that area of interest becomes the snap point or map matched point along the road segment.

FIG. 6 is a flowchart for a method of map matching probe data points to a road link of a map database based on pre-computed areas of interest associated with road links within a geographic area. As shown in block 400 of FIG. 6, the apparatus 10 of an example embodiment may include means, such as the processor 12 or the like, for obtaining a link from a list of links. This list of links may be stored, for example, in a map database 110 of a map data service provider 108. A plurality of areas of interest may be calculated along a length of the road link as shown at 410 by means, such as the processor 12. A centroid for each of the areas of interest along the road link may be calculated at 420 by means, such as the processor 12. A probe data point may be received by means, such as the processor 12, the communications interface 16 or the like, from a probe apparatus at 430 including location information associated with the probe apparatus. The probe data point may be received from a probe representing the location of a vehicle, and may be received via communications interface 16 before being processed by processor 12 of apparatus 10, for example. At 440, the apparatus 10 includes means, such as the processor 12, for establishing that the probe data point location corresponds to the geographic area. The apparatus 10 also includes means, such as the processor 12, for determining an area of interest along the road link that corresponds to the probe data point location at 450. The probe data point is map matched by means, such as the processor 12, to the centroid of the area of interest determined to correspond to the probe data point location as shown at 460. This map matched location may then be used by means, such as the processor 12, to provide for navigational assistance or at least semi-autonomous vehicle control as shown at 470.

Operations 400-420 may be performed systematically to generate areas of interest for all or a portion of road links from among a plurality of road links for a region. The areas of interest may be determined and stored for road links that satisfy certain criteria, such as traffic volume traversing the link such that only those road links that are regularly traversed are subject to spatial boundary determination. Optionally, all road links may be subject to area of interest determination and storage, where road links may be prioritized according to road link properties, such as road class, traffic volume during a period of time, age of road link, time since road link was last subject to spatial boundary determination, or the like.

One a probe data point has been map matched to a particular road link, according to some embodiments, the probe data point may be projected onto the road link. This projection may at least partially mitigate GPS or locationing error in the probe data point location. As locationing means often have error, probe data points may not fall directly on a road segment, such that map matching may help align the probe data points with an identified and mapped road link represented by a poly line. According to an example embodiment, the apparatus 10 includes means, such as the processor 12, the memory 14 or the like, for associating the probe data point with a road link, and optionally, the centroid of an area of interest in such a manner that the error associated with the probe data point along the length of the road link may be limited to a maximum of the acceptable error threshold.

FIG. 6 illustrates a flowchart of an apparatus, method and computer program product according to example embodiments of the disclosure. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present disclosure and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus to map match probe data points to a road segment including at least one processor and at least one non-transitory memory including computer program code instructions, the computer program code instructions configured to, when executed, cause the apparatus to at least:
obtain a road link within a geographic area from a database of a plurality of road links;
calculate a plurality of areas of interest along a length of the road link;
calculate a centroid of each of the plurality of areas of interest along the length of the road link;

receive a probe data point from a probe apparatus comprising one or more sensors and being onboard a vehicle, wherein the probe data point comprises location information associated with the probe apparatus;

determine that the probe data point location information corresponds to the geographic area;

determine that the probe data point location corresponds to an area of interest disposed along the road link within the geographic area;

map match the probe data point to the centroid of the area of interest determined to correspond to the probe data point location; and provide for at least one of navigational assistance or at least semi-autonomous vehicle control in response to map matching the probe data point to the centroid of the area of interest.

2. The apparatus of claim 1, wherein causing the apparatus to calculate a plurality of areas of interest comprises causing the apparatus to:

determine a maximum map match distance within which a probe data point must be of a road segment to be map matched to that road segment; and determine an acceptable error threshold defining a maximum acceptable distance error for map matching a probe data point along a road segment;

wherein each of the plurality of areas of interest is a rectangle having a first dimension based upon the maximum map match distance and a second dimension based upon the acceptable error threshold.

3. The apparatus of claim 2, wherein the first dimension for an area of interest extends in a longitudinal direction and the second dimension extends in a latitudinal direction in response to a heading of the road link being between northeast and southeast or between northwest and southwest;

wherein the first dimension for an area of interest extends in a latitudinal direction and the second dimension extends in a longitudinal direction in response to the heading of the road link being between northwest and northeast or between southwest and southeast.

4. The apparatus of claim 3, wherein each area of interest is defined by at least two points, each point including a latitude and a longitude, and each of the at least two points defining a corner of the rectangle of the area of interest.

5. The apparatus of claim 4, wherein map matching the probe data point to an area of interest comprises causing the apparatus to:

compare a latitude of the probe data point against a minimum latitude of the at least two points of a respective area;

compare the latitude of the probe data point against a maximum latitude of the at least two points of the respective area;

compare a longitude of the probe data point against a minimum longitude of the at least two points of the respective area; and compare the longitude of the probe data point against a maximum longitude of the at least two points of the respective area;

wherein the probe data point is map matched to the area of interest in response to the latitude of the probe data point being above the minimum latitude of the at least two points of the area of interest and below the maximum latitude of the at least two points of the area of interest, and the longitude of the probe data point being above the minimum longitude of the at least two points of the area of interest and below the maximum longitude of the at least two points of the area of interest.

6. The apparatus of claim 1, wherein causing the apparatus to determine that the probe data point location corresponds to an area of interest within the geographic area disposed along the road link comprises causing the apparatus to:

determine that the probe data point location corresponds to at least two areas of interest within the geographic area;

determine a heading of the probe data point; and determine a heading of each of the at least two areas of interest corresponding to a portion of the road link to which each of the at least two areas of interest correspond;

wherein causing the apparatus to determine that the probe data point location corresponds to an area of interest within the geographic area disposed along the road link comprises causing the apparatus to determine that the probe data point location corresponds to an area of interest of the at least two areas of interest having a heading closest to the heading of the probe data point.

7. The apparatus of claim 1, wherein causing the apparatus to determine that the probe data point location corresponds to an area of interest within the geographic area disposed along the road link comprises causing the apparatus to:

determine that the probe data point location corresponds to at least two areas of interest within the geographic area; and calculate a distance from the probe data point location to a centroid of each of the at least two areas of interest;

wherein causing the apparatus to determine that the probe data point location corresponds to an area of interest within the geographic area disposed along the road link comprises causing the apparatus to determine that the probe data point location corresponds to an area of interest of the at least two areas of interest having a centroid closest to the location of the probe data point.

8. A computer program product comprising at least one non-transitory computer-readable storage medium having computer-executable program code portions stored therein, the computer-executable program code portions comprising program code instructions configured to:

obtain a road link within a geographic area from a database of a plurality of road links;

calculate a plurality of areas of interest along a length of the road link;

calculate a centroid of each of the plurality of areas of interest along the length of the road link;

receive a probe data point from a probe apparatus comprising one or more sensors and being onboard a vehicle, wherein the probe data point comprises location information associated with the probe apparatus;

determine that the probe data point location information corresponds to the geographic area;

determine that the probe data point location corresponds to an area of interest disposed along the road link within the geographic area;

map match the probe data point to a centroid of the area of interest determined to correspond to the probe data point location; and provide for at least one of navigational assistance or at least semi-autonomous vehicle control in response to map matching the probe data point to the centroid of the area of interest.

9. The computer program product of claim 8, wherein the program code instructions to calculate a plurality of areas of interest comprise program code instructions to:
   determine a maximum map match distance within which a probe data point must be of a road segment to be map matched to that road segment; and
   determine an acceptable error threshold defining a maximum acceptable distance error for map matching a probe data point along a road segment;
   wherein each of the plurality of areas of interest is a rectangle having a first dimension based upon the maximum map match distance and a second dimension based upon acceptable error threshold.

10. The computer program product of claim 9, wherein the first dimension for an area of interest extends in a longitudinal direction and the second dimension extends in a latitudinal direction in response to a heading of the road link being between northeast and southeast or between northwest and southwest;
   wherein the first dimension for an area of interest extends in a latitudinal direction and the second dimension extends in a longitudinal direction in response to the heading of the road link being between northwest and northeast or between southwest and southeast.

11. The computer program product of claim 10, wherein each area of interest is defined by at least two points, each point including a latitude and a longitude, and each of the at least two points defining a corner of the rectangle of the area of interest.

12. The computer program product of claim 11, wherein the program code instructions to map match the probe data point to an area of interest comprise program code instructions to:
   compare a latitude of the probe data point against a minimum latitude of the at least two points of a respective area;
   compare the latitude of the probe data point against a maximum latitude of the at least two points of the respective area;
   compare a longitude of the probe data point against a minimum longitude of the at least two points of the respective area; and
   compare the longitude of the probe data point against a maximum longitude of the at least two points of the respective area;
   wherein the probe data point is map matched to the area of interest in response to the latitude of the probe data point being above the minimum latitude of the at least two points of the area of interest and below the maximum latitude of the at least two points of the area of interest, and the longitude of the probe data point being above the minimum longitude of the at least two points of the area of interest and below the maximum longitude of the at least two points of the area of interest.

13. The computer program product of claim 8, wherein the program code instructions to determine that the probe data point location corresponds to an area of interest within the geographic area disposed along the road link comprise program code instructions to:
   determine that the probe data point location corresponds to at least two areas of interest within the geographic area;
   determine a heading of the probe data point; and
   determine a heading of each of the at least two areas of interest corresponding to a portion of the road link to which each of the at least two areas of interest correspond;
   wherein the program code instructions to determine that the probe data point location corresponds to an area of interest within the geographic area disposed along the road link comprises program code instructions to determine that the probe data point location corresponds to an area of interest of the at least two areas of interest having a heading closest to the heading of the probe data point.

14. The computer program product of claim 8, wherein the program code instructions to determine that the probe data point location corresponds to an area of interest within the geographic area disposed along the road link comprise program code instructions to:
   determine that the probe data point location corresponds to at least two areas of interest within the geographic area; and
   calculate a distance from the probe data point location to a centroid of each of the at least two areas of interest;
   wherein the program code instructions to determine that the probe data point location corresponds to an area of interest within the geographic area disposed along the road link comprises program code instructions to determine that the probe data point location corresponds to an area of interest of the at least two areas of interest having a centroid closest to the location of the probe data point.

15. A method comprising:
   obtaining a road link within a geographic area from a database of a plurality of road links;
   calculating a plurality of areas of interest along a length of the road link;
   calculating a centroid of each of the plurality of areas of interest along the length of the road link;
   receiving a probe data point from a probe apparatus comprising one or more sensors and being onboard a vehicle, wherein the probe data point comprises location information associated with the probe apparatus;
   determining that the probe data point location information corresponds to the geographic area;
   determining that the probe data point location corresponds to an area of interest disposed along the road link within the geographic area;
   map matching the probe data point to a centroid of the area of interest determined to correspond to the probe data point location; and
   providing for at least one of navigational assistance or at least semi-autonomous vehicle control in response to map matching the probe data point to the centroid of the area of interest.

16. The method of claim 15, wherein calculating a plurality of areas of interest comprises:
   determining a maximum map match distance within which a probe data point must be of a road segment to be map matched to that road segment; and
   determining an acceptable error threshold defining a maximum acceptable distance error for map matching a probe data point along a road segment;
   wherein each of the plurality of areas of interest is a rectangle having a first dimension based upon the maximum map match distance and a second dimension based upon the acceptable error threshold.

17. The method of claim 16, wherein the first dimension for an area of interest extends in a longitudinal direction and the second dimension extends in a latitudinal direction in response to a heading of the road link being between northeast and southeast or between northwest and southwest;

wherein the first dimension for an area of interest extends in a latitudinal direction and the second dimension extends in a longitudinal direction in response to the heading of the road link being between northwest and northeast or between southwest and southeast.

18. The method of claim 17, wherein each area of interest is defined by at least two points, each point including a latitude and a longitude, and each of the at least two points defining a corner of the rectangle of the area of interest.

19. The method of claim 18, wherein map matching the probe data point to an area of interest comprises:
   comparing the latitude of the probe data point against a minimum latitude of the at least two points of a respective area;
   comparing the latitude of the probe data point against a maximum latitude of the at least two points of the respective area;
   comparing the longitude of the probe data point against a minimum longitude of the at least two points of the respective area; and
   comparing the longitude of the probe data point against a maximum longitude of the at least two points of the respective area;
   wherein the probe data point is map matched to the area of interest in response to the latitude of the probe data point being above the minimum latitude of the at least two points of the area of interest and below the maximum latitude of the at least two points of the area of interest, and the longitude of the probe data point being above the minimum longitude of the at least two points of the area of interest and below the maximum longitude of the at least two points of the area of interest.

20. The method of claim 15, wherein determining that the probe data point location corresponds to an area of interest within the geographic area disposed along the road link comprises:
   determining that the probe data point location corresponds to at least two areas of interest within the geographic area;
   determining a heading of the probe data point; and
   determining a heading of each of the at least two areas of interest corresponding to a portion of the road link to which each of the at least two areas of interest correspond;
   wherein determining that the probe data point location corresponds to an area of interest within the geographic area disposed along the road link comprises determining that the probe data point location corresponds to an area of interest of the at least two areas of interest having a heading closest to the heading of the probe data point.

* * * * *